(12) United States Patent
Suenaga et al.

(10) Patent No.: US 7,755,639 B2
(45) Date of Patent: Jul. 13, 2010

(54) IMAGE REPRODUCTION USING A PARTICULAR COLOR SPACE

(75) Inventors: Kazunori Suenaga, Nagano-ken (JP); Kenji Fukasawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 744 days.

(21) Appl. No.: 10/561,908

(22) PCT Filed: Aug. 27, 2004

(86) PCT No.: PCT/JP2004/012800

§ 371 (c)(1),
(2), (4) Date: Dec. 21, 2005

(87) PCT Pub. No.: WO2006/022028

PCT Pub. Date: Mar. 2, 2006

(65) Prior Publication Data

US 2007/0109563 A1      May 17, 2007

(51) Int. Cl.
  G09G 5/02       (2006.01)
  G06T 9/00       (2006.01)
  G06K 9/36       (2006.01)

(52) U.S. Cl. .................... 345/600; 345/604; 345/555; 382/166; 382/232

(58) Field of Classification Search ................ 345/604, 345/555; 382/166, 232
See application file for complete search history.

(56) References Cited

U.S. PATENT DOCUMENTS

| | | | |
|---|---|---|---|
| 5,349,452 A | | 9/1994 | Maeda et al. |
| 6,094,454 A | * | 7/2000 | Mitchell et al. ......... 375/240.18 |
| 6,791,620 B1 | * | 9/2004 | Elswick et al. .............. 348/441 |
| 6,876,389 B1 | * | 4/2005 | Honma .................. 348/333.12 |
| 6,967,675 B1 | * | 11/2005 | Ito et al. ................... 348/207.1 |
| 7,057,772 B1 | * | 6/2006 | Bannai ...................... 358/3.01 |
| 7,253,918 B2 | | 8/2007 | Nishide et al. |
| 7,327,490 B2 | | 2/2008 | Kuwata et al. |
| 2002/0001410 A1 | * | 1/2002 | Hagiwara ................... 382/232 |
| 2002/0036702 A1 | * | 3/2002 | Ohnogi .................. 348/333.05 |
| 2002/0089702 A1 | * | 7/2002 | Yoshitani et al. ............ 358/448 |
| 2002/0097334 A1 | * | 7/2002 | Nishi et al. .................. 348/373 |
| 2002/0122194 A1 | | 9/2002 | Kuwata et al. |
| 2002/0196346 A1 | | 12/2002 | Nishio et al. |
| 2003/0016862 A1 | | 1/2003 | Ohga |
| 2003/0034986 A1 | | 2/2003 | Fukasawa |
| 2003/0043166 A1 | | 3/2003 | Kumada et al. |

(Continued)

FOREIGN PATENT DOCUMENTS

EP      1 187 462 A2      3/2002

(Continued)

OTHER PUBLICATIONS

Hiroaki, et al., "Mac Fan Special 24 Adobe Photoshop 7.0 Basics & Tips", 2002, pp. 62-65.

*Primary Examiner*—Xiao M Wu
*Assistant Examiner*—David T Welch
(74) *Attorney, Agent, or Firm*—Sughrue Mion, PLLC

(57) ABSTRACT

The image processing apparatus executes a prescribed basic color space conversion regardless of content of the color space identification information when a reduced image is a processing target. The image processing apparatus executes a specified color space conversion utilizing a color space specified by the color space identification information when a main image is a processing target.

10 Claims, 14 Drawing Sheets

U.S. PATENT DOCUMENTS

| | | |
|---|---|---|
| 2003/0052894 A1 | 3/2003 | Akiyama et al. |
| 2003/0112334 A1 | 6/2003 | Kiyokawa |
| 2003/0133138 A1 | 7/2003 | Namikata |
| 2003/0147563 A1* | 8/2003 | Liu et al. .................... 382/276 |
| 2004/0174458 A1* | 9/2004 | Okubo .................... 348/397.1 |
| 2004/0212817 A1 | 10/2004 | Hagai et al. |
| 2004/0246506 A1* | 12/2004 | Hoshuyama et al. ......... 358/1.1 |
| 2004/0263533 A1* | 12/2004 | Yamamoto et al. .......... 345/619 |
| 2005/0018907 A1* | 1/2005 | Kawanishi et al. .......... 382/232 |
| 2006/0050151 A1* | 3/2006 | Fujinawa ............... 348/207.99 |

FOREIGN PATENT DOCUMENTS

| | | |
|---|---|---|
| EP | 1 231 775 A2 | 8/2002 |
| EP | 1 569 471 A1 | 8/2005 |
| JP | 07-302342 A | 11/1995 |
| JP | 9-139876 A | 5/1997 |
| JP | 9-322114 A | 12/1997 |
| JP | 2002-15314 A | 1/2002 |
| JP | 2002-252799 A | 9/2002 |
| JP | 2002-314797 A | 10/2002 |
| JP | 2002-314831 A | 10/2002 |
| JP | 2002-344764 A | 11/2002 |
| JP | 2003-87587 A | 3/2003 |
| JP | 2003-143420 A | 5/2003 |
| JP | 2004-80737 A | 3/2004 |
| JP | 2004-96400 A | 3/2004 |
| JP | 2004-222078 A | 8/2004 |
| WO | WO 02/065766 A1 | 8/2002 |

* cited by examiner

EXAMPLE OF DISPLAY OF THUMBNAIL IMAGES IN EXPANDED COLOR SPACE-COMPATIBLE IMAGE REPRODUCING APPARATUS

EXAMPLE OF DISPLAY OF MAIN IMAGE IN EXPANDED COLOR SPACE-COMPATIBLE IMAGE REPRODUCING APPARATUS (sRGB IMAGE DATA)

EXAMPLE OF DISPLAY OF MAIN IMAGE IN EXPANDED COLOR SPACE-COMPATIBLE IMAGE REPRODUCING APPARATUS (wRGB IMAGE DATA)

EXAMPLE OF DISPLAY OF MAIN IMAGE IN EXPANDED COLOR SPACE-INCOMPATIBLE IMAGE REPRODUCING APPARATUS (sRGB IMAGE DATA)

WARNING DURING DISPLAY OF MAIN IMAGE IN EXPANDED COLOR SPACE-INCOMPATIBLE IMAGE REPRODUCING APPARATUS (wRGB IMAGE DATA)

EXAMPLE OF PRINTING OF THUMBNAIL IMAGES BY PRINTER

EXAMPLE OF DISPLAY OF IMAGES ON DIGITAL CAMERA

IMAGE REPRODUCTION USING A PARTICULAR COLOR SPACE

TECHNICAL FIELD

The present invention relates to a technology to reproduce images based on image data.

BACKGROUND ART

Images captured by an image generating device such as a digital still camera or a video camera are reproduced by various types of image reproduction apparatus such as a computer or printer (see JP9-139876A or JP9-322114A). It is normally assumed that the image data created by the image generating device will be reproduced using a standard color space such as the sRGB color space. For example, an image reproduction apparatus generates reproduction image data expressed in a standard color space by carrying out basic color space conversion to the image data created by the image generating device, and reproduces (i.e., displays or prints) images based on this reproduction image data.

Incidentally, there are cases in which a color space having a color reproduction range different from that of the standard color space (particularly a color space having a larger color reproduction range than the standard color space) is desired for image reproduction. For example, if it is specified in the image data file that the color space used when the image data was created is a particular color space different from the standard color space, the color reproduction range possessed by that particular color range can be used during reproduction.

However, there is a problem that the use of a particular color space for each and every image processing may require too much time.

DISCLOSURE OF THE INVENTION

The present invention was devised in order to resolve the problems with the prior art described above, and an object thereof is to attain image processing having well-balanced characteristics concerning high processing quality using a specified color space and high processing speed.

In order to attain at least part of the above object, an image processing apparatus according to the present invention is an apparatus for processing an image based on an image data set including main image data that represents a main image, reduced image data that represents a reduced image of the main image, and color space identification information that expresses a color space related to the main image data, the main image data and the reduced image data and the color space identification information being associated with one another. The color space identification information can indicate which of multiple color spaces including a prescribed standard color space and a particular color space is to be used. The image processing apparatus comprises: a data processor configured to select either one of the main image data and the reduced image data as processing target image data, and to execute processing including color space conversion to the processing target image data. The data processor executes a prescribed basic color space conversion regardless of content of the color space identification information when the reduced image is the processing target, while the data processor executes a specified color space conversion utilizing a color space specified by the color space identification information when the main image is the processing target.

Since this image processing apparatus executes the prescribed basic color space conversion when the reduced image is a processing target and executes the specified color space conversion utilizing a color space specified by the color space identification information when the main image is a processing target, it can attain high speed processing for the reduced image and high quality processing utilizing the specified color space for the main image.

An image reproducing apparatus according to the present invention is an apparatus for reproducing an image based on an image data set including image data and color space identification information that expresses a color space related to the data, where the data and information is associated with each other. The color space identification information can indicate which of multiple color spaces including a prescribed standard color space and a particular color space is to be used. The image reproducing apparatus comprises a data processor configured to select the image data as processing target image data and to generate reproduction image data by executing processing including color space conversion to the processing target image data; and an image output device configured to output a visible image in accordance with the reproduction image data. The data processor includes a color space determination module configured to determine a color space specified by the color space identification information; and a color space converter having a basic color space conversion function that performs color space conversion of the processing target image data without using the particular color space, and a device-dependent color space conversion function that converts the processing target image data to a device-dependent color space compatible with the image output apparatus using the particular color space. The data processor executes: (i) when the color space specified by the color space identification information is the standard color space, generating the reproduction image data by performing the basic color conversion to the processing target image data; and (ii) when the color space specified by the color space identification information is the particular color space, generating the reproduction image data by performing the device-dependent color conversion to the processing target image data.

Because this image reproducing apparatus has a basic color space conversion function and a device-dependent color space conversion function, appropriate image reproduction can be carried out regardless of whether the color space specified by the color space identification information is the standard color space or a different particular color space. More specifically, because (i) during reproduction of image data for which the color space specified by the color space identification information is the standard color space, reproduction image data is generated by carrying out basic color space conversion to the image data, but (ii) during reproduction of image data for which the color space specified by the color space identification information is a particular color space different from the standard color space, reproduction image data is generated by carrying out device-dependent color space conversion to the image data, appropriate image reproduction compatible with the specified color space for the image data can be performed in either case.

The image data set may include main image data that represents a main image and reduced image data that represents a reduced image of the main image. In this case, when the processing target image data is the main image data, the data processor executes the processing (i) or (ii) in accordance with the color space identification information.

In the processing (ii) of the image reproducing apparatus, the image processor may cause the image output apparatus to output a notification indicating that the specified color space is not the standard color space.

According to this construction, because during reproduction of main image data for which the color space specified by the color space identification information is not the standard color space, a notification indicating that the specified color space is not the standard color space is output, the user can acknowledge that the reproduced colors are not necessarily the colors that should be reproduced for that image data.

The data processor may execute (iii) when the processing target image data is the reduced image data, generating the reproduction image data by performing the basic color space conversion to the reduced image data regardless of whether or not the color space specified by the color space identification information is the standard color space.

According to this construction, reduced images can be reproduced at high speed regardless of the color space specified by the color space identification information.

In the processing (iii), the data processor may cause the image output apparatus to output together with the reduced image a notification indicating that the specified color space is not the standard color space.

According to this construction, the user can select images and initiate processing with reference to this notification.

The present invention may be realized in various forms, such as an image reproduction method and image reproducing apparatus, a computer program that implements the functions of this method or apparatus, or a recording medium on which this computer program is recorded.

BEST MODE FOR CARRYING OUT THE INVENTION

Embodiments of the present invention will be described below in the following sequence.

A. Construction of apparatus

Figure 1:
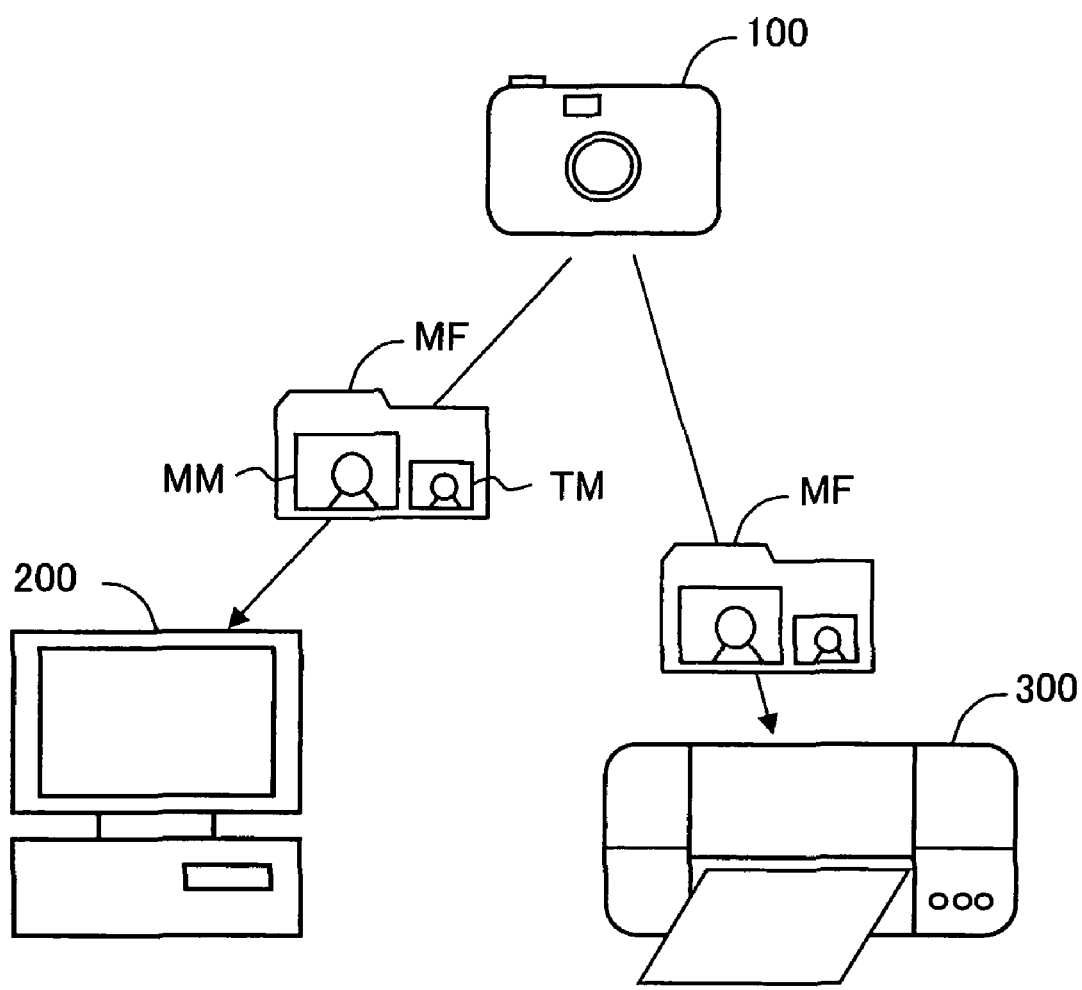
FIG. 1 is an explanatory drawing showing the construction of an image generation/reproduction system comprising an embodiment of the present invention.

B. Image reproduction by expanded color space-compatible image reproducing apparatus C. Image reproduction by expanded color space-incompatible image reproducing apparatus D. Example of application to printer E. Other embodiment F. Variations A. Construction of Apparatus FIG. 1 is an explanatory drawing showing the construction of an image generation/reproduction system embodying the present invention. This system includes a digital camera 100, a computer 200 and a printer 300. The digital camera 100 functions as an image generating device, while the computer 200 and the printer 300 respectively function as image reproducing apparatuses. Image data file MF generated by the digital camera 100 is supplied to the computer 200 or the printer 300 and reproduced thereby. In this Specification, 'reproduction' includes display on a monitor and printing. The description below refers mainly to image reproduction using the computer 200.

Figure 2:
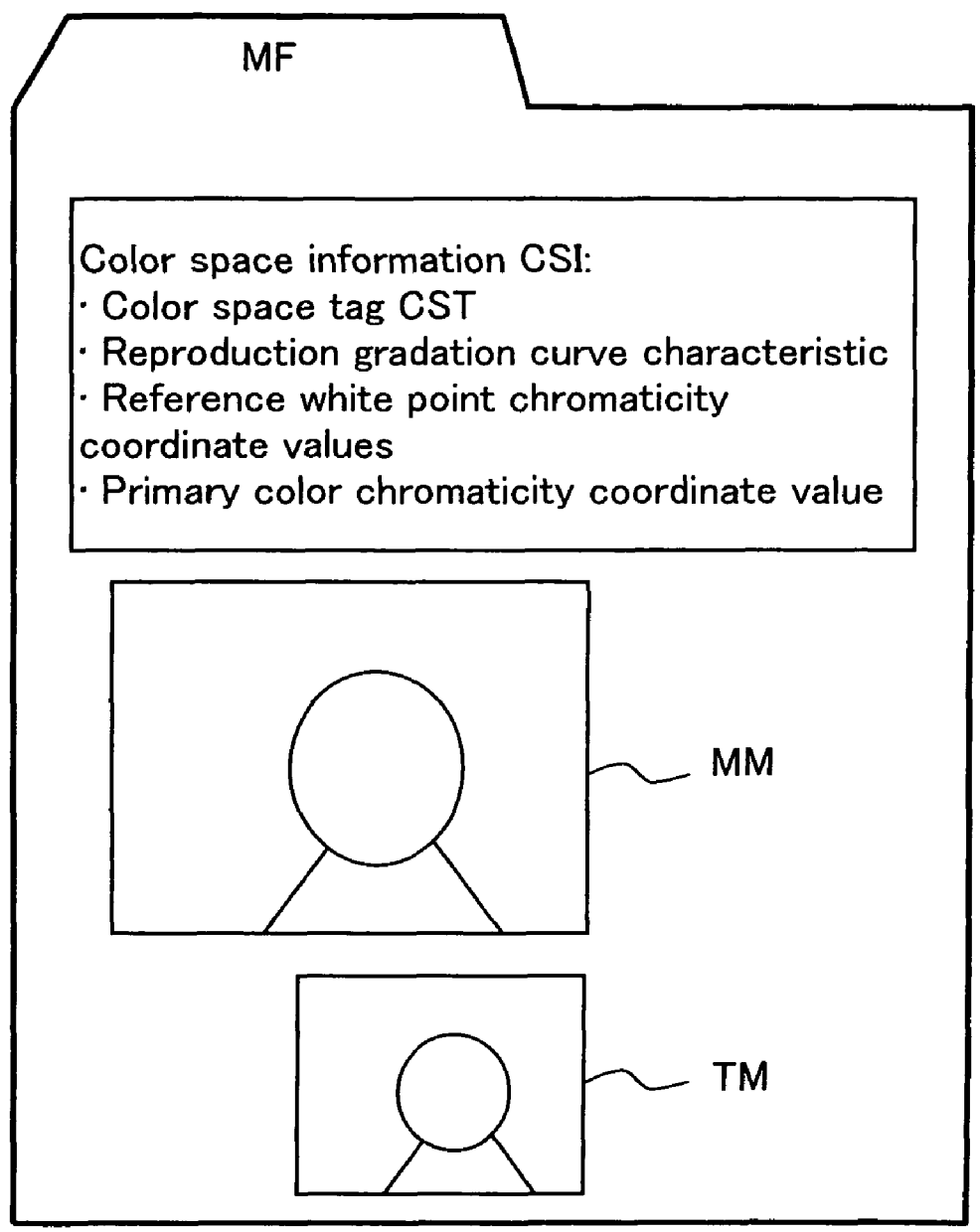
FIG. 2 is an explanatory drawing showing the construction of an image data file MF.

FIG. 2 is an explanatory drawing showing the construction of the image data file MF. This image data file MF includes color space information CSI, main image data MM and thumbnail image data TM. The main image data MM and thumbnail image data TM ordinarily have a compressed data file format (such as JPEG, for example). Because a thumbnail image is simply a main image that is reduced in size, it is also called a 'reduced image' herein.

The color space information CSI is information that expresses the color space (hereinafter the 'specified color space') that is specified as relating to the image data (the main image data MM or thumbnail image data TM). Specifically, the color space information CSI includes, for example, a color space tag CST, the reproduction gradation curve characteristic or tone curve, reference white point chromaticity coordinate values and primary color chromaticity coordinate values. The primary color chromaticity coordinate values include the chromaticity coordinate values for the three primary colors of RGB. Typically, the color space specified by the color space information CSI expresses the color space used when the image data was created.

The value of the color space tag CST indicates the type of color space. Specifically, the color space can be determined in accordance with the value of the color space tag CST as indicated below, for example:

(1) CST=1: Standard color space (2) CST=2: Expanded color space.

In the description below, the sRGB color space, which is the standard color space used by the monitor, is used as the standard color space. For the expanded color space, AdobeRGB (trademark of Adobe Corporation), for example, may be used. In the description below, the expanded color space will be called the 'wRGB color space' and the standard color space will be called the 'sRGB color space'. Non-standard color spaces that can be specified using the color space tag CST are not limited to the expanded color space wRGB, and in general any particular color space having a color reproduction range different from that of the standard color space may be used. In addition, the number of color spaces that may be specified using the color space tag CST is not limited to two, and in general the color space tag CST may specify any of multiple color spaces.

The other parameter values included in the color space information CSI (reproduction gradation curve characteristic, reference white point chromaticity coordinate values, and primary color chromaticity coordinate values) are used as a color space conversion profile to generate a color space conversion matrix.

Figure 3:
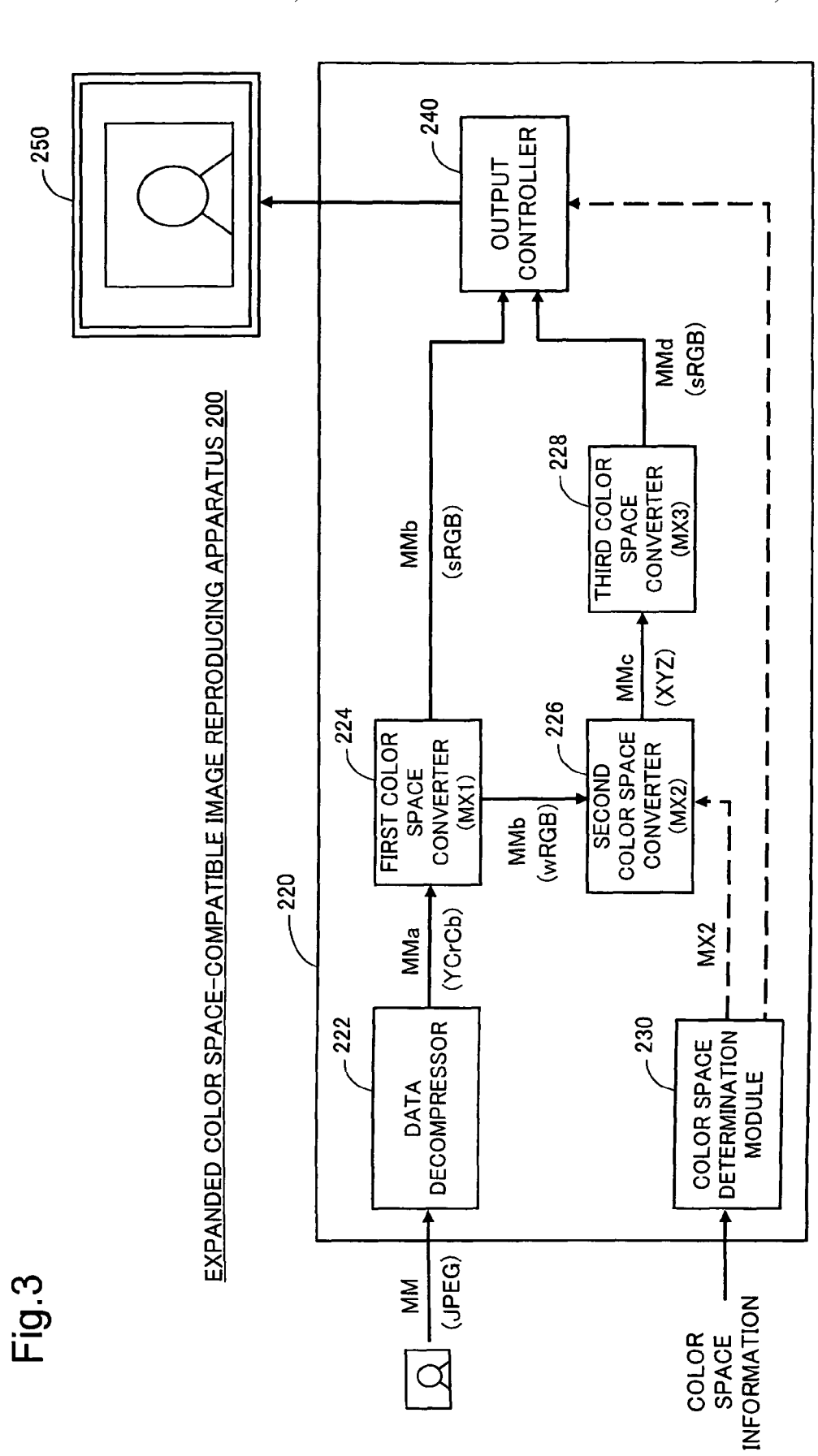
FIG. 3 is a block diagram showing the construction of an image reproducing apparatus that is compatible with an expanded color space wRGB.

FIG. 3 is a block diagram showing the construction of an image reproducing apparatus 200 compatible with the expanded color space wRGB. This image reproducing apparatus 200 includes a data processor 220 and a monitor (image display device) 250. The data processor 220 has a data decompressor 222, three color space converters 224, 226, 228, a color space determination module 230 and an output controller 240. The data processor 220 selects either the main image data MM or the thumbnail image data TM as processing target image data and executes reproduction processing thereto.

The color space determination module 230 determines the specified color space from the color space information CSI pertaining to the image data file MF (see FIG. 2). The color space determination module 230 has a function to create an expanded color space wRGB conversion matrix MX2 and provide it to the second color space converter 226 if the specified color space is the expanded color space wRGB, and a function to provide warning display data (described below) to the output controller 240.

The data decompressor 222 decompresses the compressed image data (the main image data MM or the thumbnail image data TM) to be processed and generates decompressed data MMa. As is well known, JPEG compressed data is expressed in the YCrCb color space.

The first color space converter 224 subjects this decompressed data MMa to color space conversion using a basic matrix MX1 and generates image data MMb expressed in the RGB color space. The basic matrix MX1 is used to convert the YCrCb color space to the RGB color space, and is pre-registered in the data decompressor 222. The image data MMb generated by this first color space converter 224 is expressed in the color space specified by the color space tag CST. In other words, the image data MMb is data expressed in the standard color space sRGB where the specified color space is the standard color space sRGB, and is expressed in the expanded color space wRGB where the specified color space is the expanded color space wRGB.

In this embodiment, the standard color space sRGB is the color space suitable for the monitor 250 (i.e., it is the device-dependent color space for the monitor 250). Therefore, where the specified color space for the processing target image data is the standard color space sRGB, the output controller 240 outputs the image to the monitor 250 using the image data MMb obtained by the first color space converter 224. On the other hand, where the specified color space for the processing target image data is the expanded color space wRGB, additional color space conversion is carried out by the second and third color space converters 226, 228 to the image data MMb obtained by the first color space converter 224.

The second color space converter 226 converts the image data MMb expressed in the expanded color space wRGB to a device-independent color space (in this embodiment, the XYZ color space). The conversion matrix MX2 used by the second color space converter 226 is provided by the color space determination module 230. This conversion matrix MX2 is generated from the reference white point chromaticity coordinate values and the primary color chromaticity values in the color space information CSI. Gradation conversion in accordance with the reproduction gradation curve characteristic is also carried out where necessary by the second color space converter 226. This is also true for other types of color space conversion.

The third color space converter 228 converts the image data MMc expressed in the XYZ color space to the device-dependent color space for the monitor 250 (in this embodiment, the sRGB color space). The conversion matrix MX3 used by the third color space converter 228 is stored in advance in the third color space converter 228. The image data MMd generated by the third color space converter 228 is provided to the output controller 240 and the image is output in accordance therewith to the monitor 250.

As described above, where the specified color space for the processing target image data is the expanded color space wRGB, an expanded color space-compatible image reproducing apparatus performs additional color space conversion using the fact that the image data MMb obtained by the first color space converter 224 is expanded color space wRGB data, and converts this data to the device-dependent color space sRGB. In other words, the expanded color space-compatible image reproducing apparatus 200 has a device-dependent color space conversion function to convert the color space to the device-dependent color space (sRGB) through use of the expanded color space wRGB. Therefore, where the specified color space for the processing target image data is the expanded color space wRGB, colors can be faithfully reproduced. Moreover, where the specified color space for the processing target image data is the standard color space sRGB, colors can be faithfully reproduced by performing basic color space conversion via the first color space converter 224.

The three color space conversions carried out by the three color space converters 224, 226, 228 may be combined into a single color space conversion.

All or part of the functions of the constituent elements of the above-described data processor 220 may be implemented by computer programs, for example. These computer programs may be provided in the form of programs recorded on a computer-readable recording medium such as a flexible disk or a CD-ROM.

Figure 4:
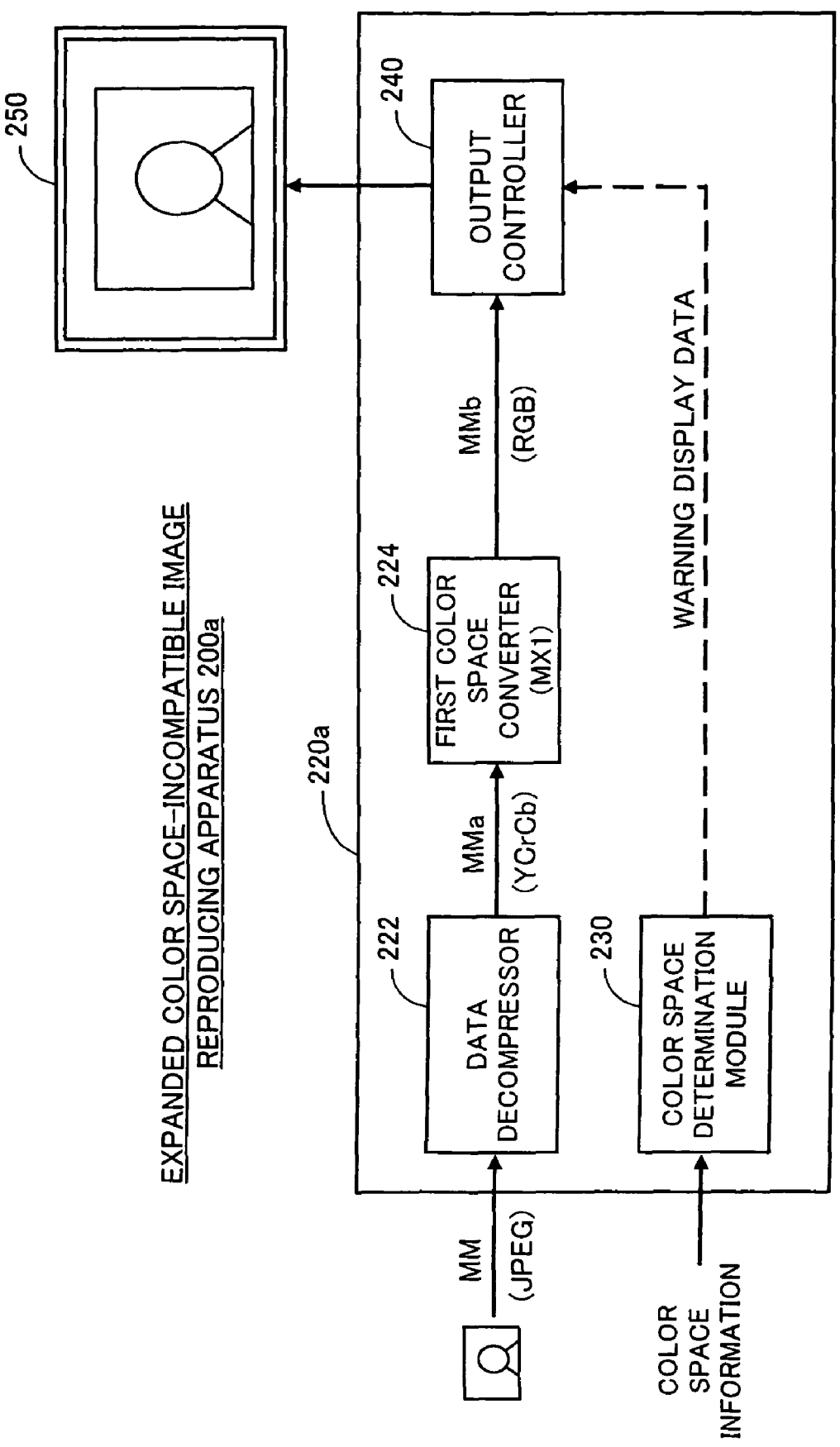
FIG. 4 is a block diagram showing the construction of an image reproducing apparatus that is not compatible with an expanded color space wRGB.

FIG. 4 is a block diagram showing the construction of an image reproducing apparatus 200a that is not compatible with the expanded color space wRGB. The only difference between the image reproducing apparatus 200a and the apparatus 200 is that the apparatus 200a does not have the second and third color space converters 226, 228, and the two apparatuses are otherwise identical. This expanded color space wRGB-incompatible image reproducing apparatus 200a does not have the function to convert the color space for the processing target image data to the device-dependent color space (sRGB) through use of the expanded color space wRGB. Accordingly, in this expanded color space-incompatible image reproducing apparatus 200a, the image is displayed on the monitor 250 in accordance with the image data MMb generated by the first color space converter 224 without regard to whether such image data MMb is standard color space sRGB data or expanded color space wRGB data. Therefore, colors can be faithfully reproduced if the specified color space is the standard color space sRGB, but cannot be faithfully reproduced if the specified color space is the expanded color space wRGB.

Figure 5:
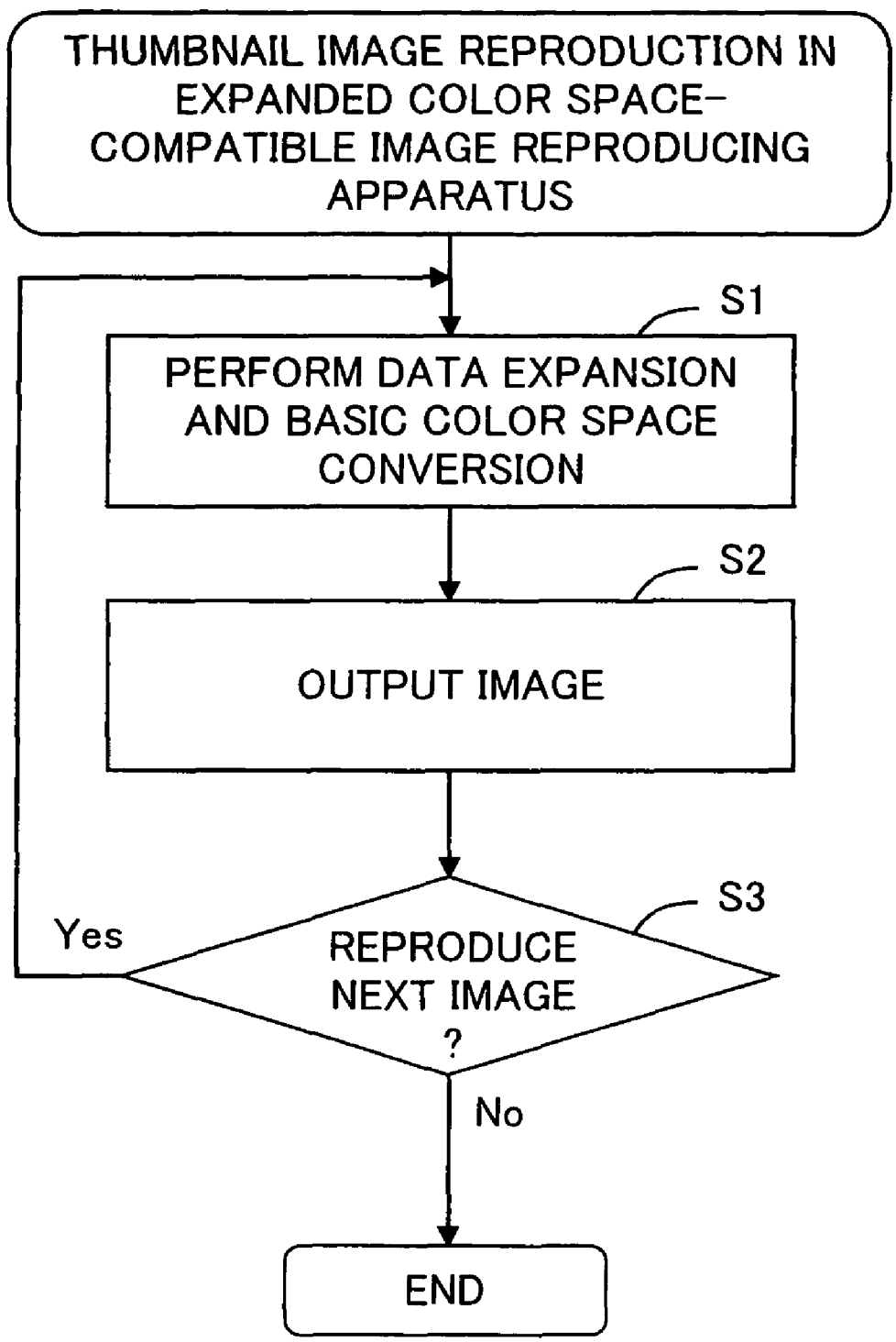
FIG. 5 is a flow chart showing the sequence of operations of a thumbnail image reproduction routine executed by an expanded color space-compatible image reproducing apparatus.

B. Image Reproduction in Expanded Color Space-Compatible Image Reproducing Apparatus FIG. 5 is a flow chart showing the sequence of operations of a thumbnail image reproduction routine executed in the expanded color space-compatible image reproducing apparatus 200 (see FIG. 3). In step S1, the data decompressor 222 (see FIG. 3) decompresses the thumbnail image data TM (see FIG. 2) and the first color space converter 224 generates image data MMb by executing basic color space conversion. In step S2, this image data MMb is provided from the output controller 240 to the monitor 250 and a thumbnail image is displayed. In step S3, when display of the next thumbnail image is requested, the image reproducing apparatus 200 returns to step S1 and the processing of steps S1 and S2 is repeated.

Figure 6:
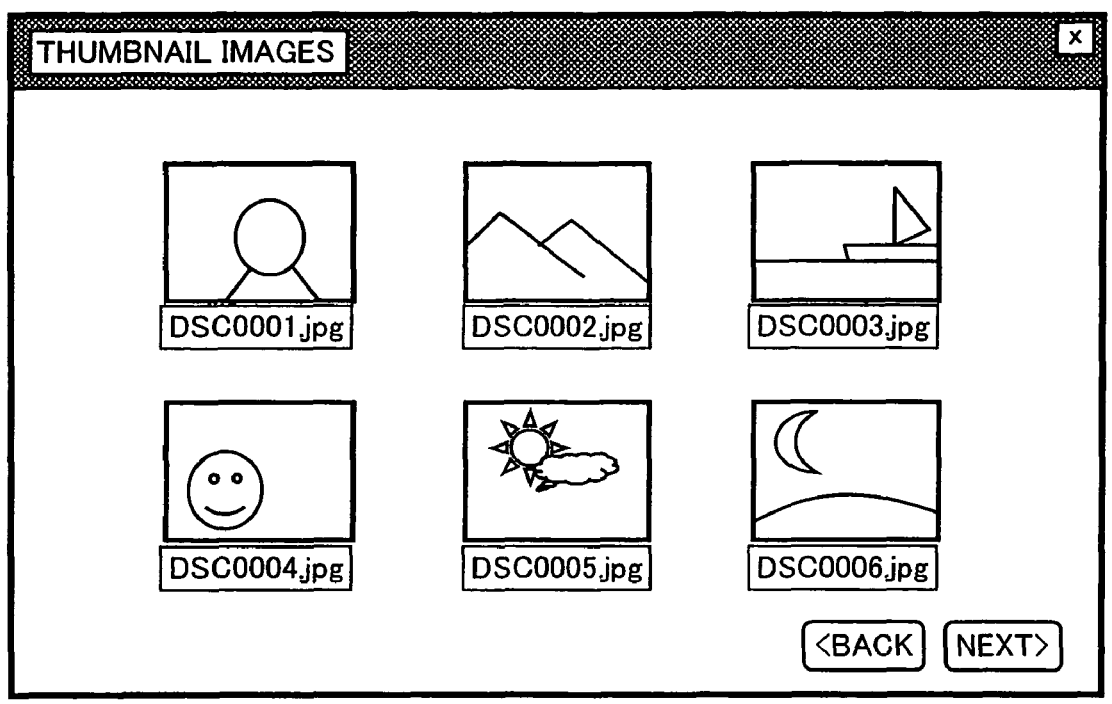
FIG. 6 is an explanatory drawing showing an example of the display of thumbnail images on an expanded color space-compatible image reproducing apparatus.

FIG. 6 is an explanatory drawing showing an example of the display of thumbnail images. Here, multiple thumbnail images are displayed in a single window. In addition, the file name of each thumbnail image is displayed adjacent thereto. Such thumbnail image display may be carried out by displaying multiple thumbnail images simultaneously as shown above, or by displaying individual thumbnail images in succession at high speed (via so-called 'frame advance'). In either case, the thumbnail images are reproduced using the sequence of operations shown in FIG. 5.

When thumbnail images are reproduced in the expanded color space-compatible image reproducing apparatus 200 as described above, because image reproduction is carried out without determination of the color space using the color space information CSI, images can be reproduced at high speed. Incidentally, if the specified color space for a thumbnail image comprising the target of processing is the expanded color space wRGB, the image data MMb obtained by the first color space converter 224 is expanded color space wRGB data. When the thumbnail image is displayed in accordance with this image data MMb, it is displayed using colors that deviate slightly from the correct colors. However, because thumbnail images are displayed in a simplified fashion to enable selection and checking of images, reproduction speed is generally more important that image quality. Therefore, as described in connection with this embodiment, it is preferred that the thumbnail images be reproduced at high speed by carrying out only basic color space conversion rather than color space conversion to a device-dependent color space. In addition, when thumbnail image reproduction is carried out, it is preferred that the processing be executed with an emphasis on high speed, without involving a check of the color space information (i.e., color space determination).

Figure 7:
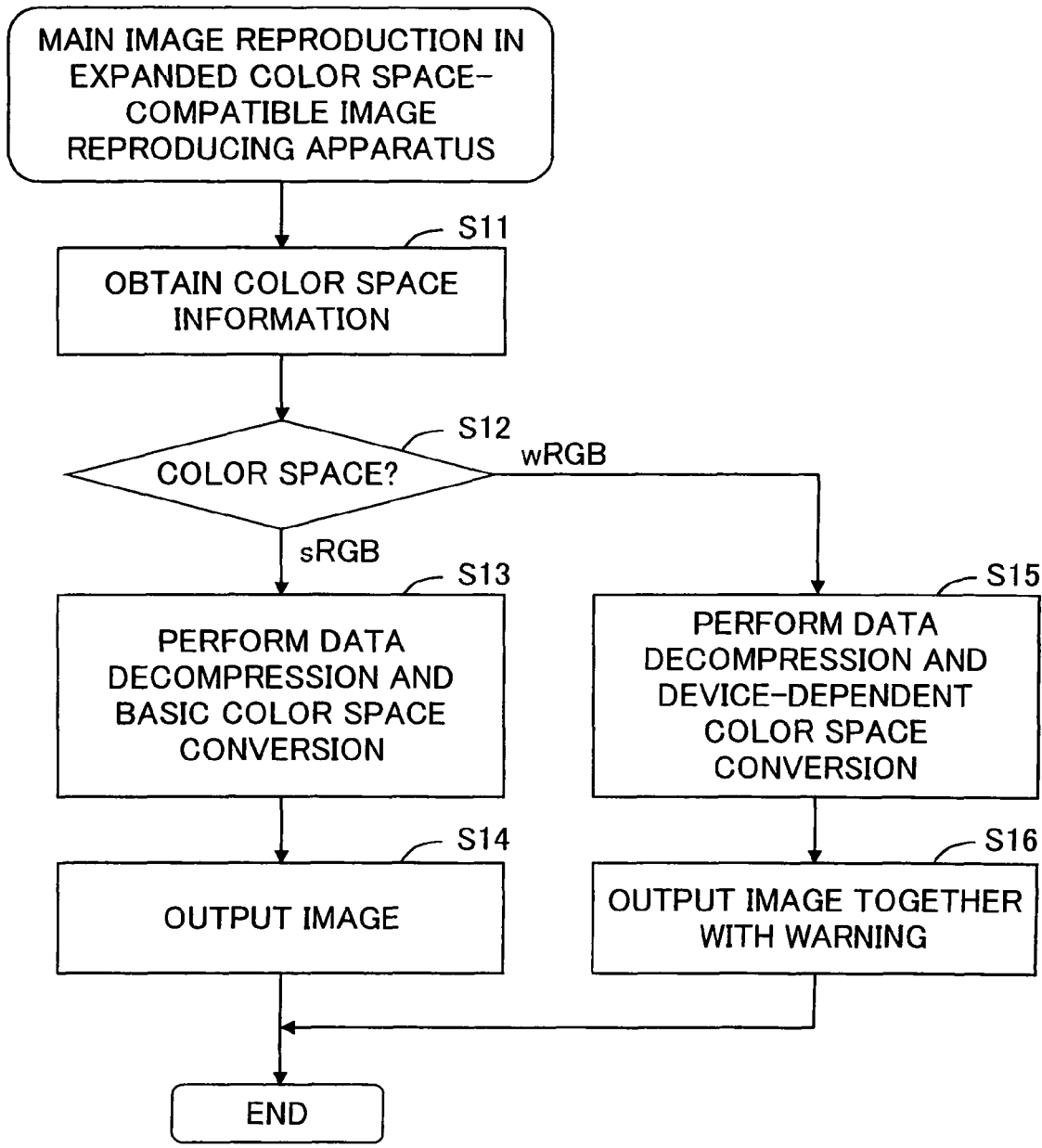
FIG. 7 is a flow chart showing the sequence of operations of a main image reproduction routine executed by the expanded color space-compatible image reproducing apparatus.

FIG. 7 is a flow chart showing the sequence of operations of a main image reproduction routine executed by the expanded color space-compatible image reproducing apparatus 200. In step S11, the color space determination module 230 obtains the color space information CSI from the image data file MF (see FIG. 2), and in step S12, it determines the specified color space. If the specified color space is the standard color space sRGB, data decompression and basic color space conversion are carried out (step S13) and an image is output in accordance with the obtained image data MMb (step S14). If the specified color space is the expanded color space wRGB, on the other hand, data decompression and device-dependent color space conversion via the three color space converters 224, 226, 228 are carried out (step S15), and an image is output in accordance with the obtained image data MMb (step S16). Simultaneously with this output, a warning (or notification) indicating that the specified color space is not the standard color space sRGB is output together with the image.

Figure 8A:
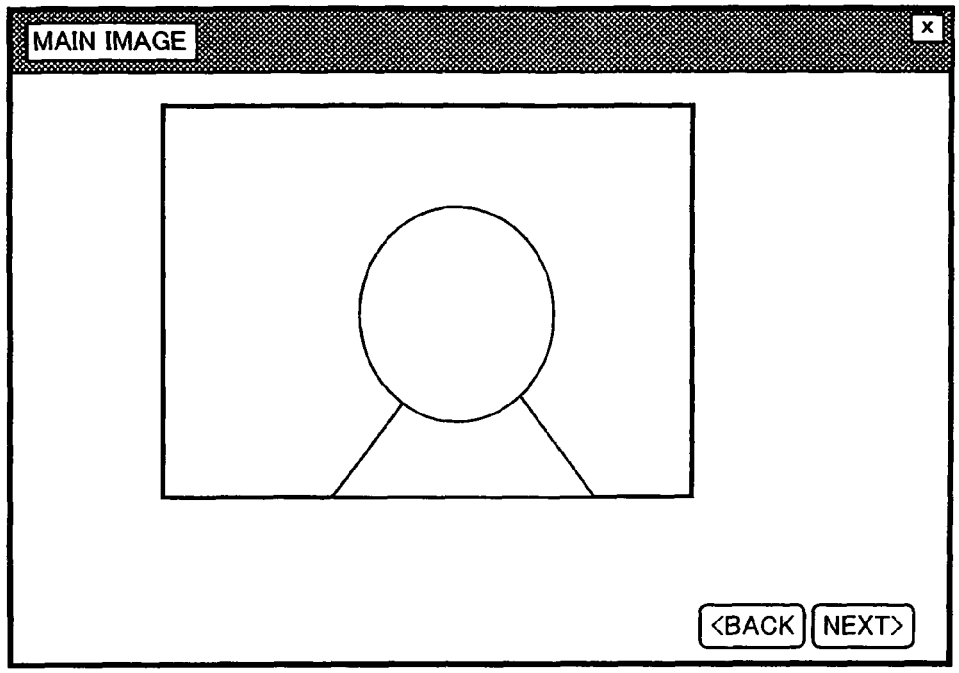
FIGS. 8A and 8B are explanatory drawings showing examples of the display of a main image on the expanded color space-compatible image reproducing apparatus.
Figure 8B:
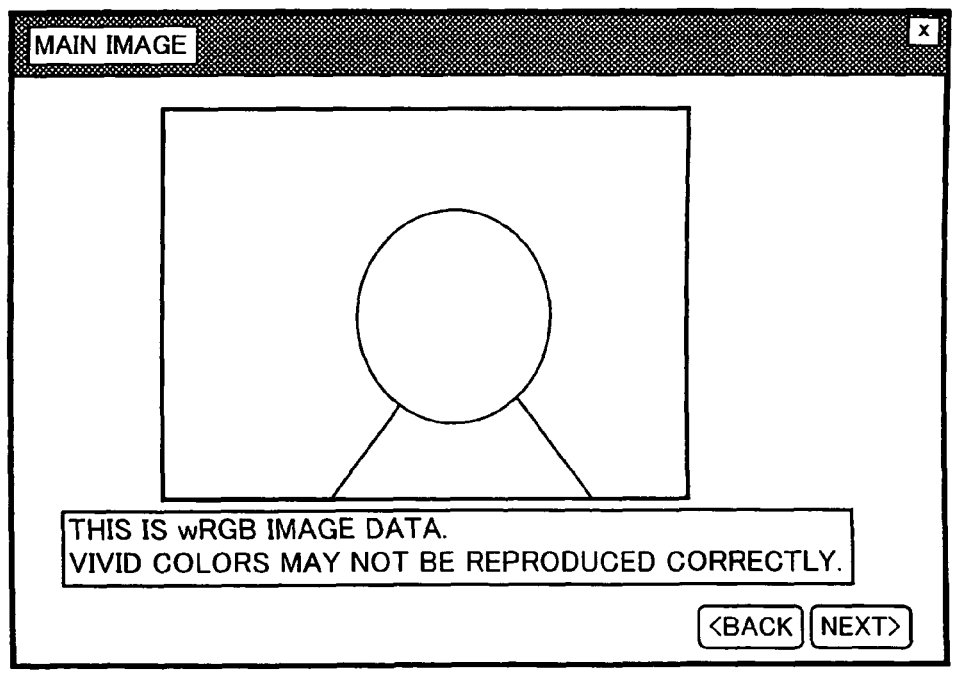

FIGS. 8A and 8B are explanatory drawings showing examples of the display of a main image displayed on the monitor 250 of the expanded color space-compatible image reproducing apparatus 200. FIG. 8A shows the case in which the specified color space is the standard color space sRGB, while FIG. 8B shows the case in which the specified color space is the expanded color space wRGB. In the example shown in FIG. 8B, the main image is displayed based on wRGB image data, but because the color reproduction range of the monitor 250 is based on the sRGB color space and is smaller than that of the wRGB color space, some of the colors may not be displayed correctly. Accordingly, where the specified color space is the expanded color space wRGB, it is preferred that a warning (or notification) be displayed indicating that the specified color space is not the standard color space sRGB. Such a display enables the user to be notified that the colors of the displayed image are different from the original colors that should be used to reproduce the image. While this warning or notification need not be displayed on the screen, it is preferred that some sort of notification be displayed indicating at least that the displayed image is based on expanded color space wRGB image data.

Where thumbnail images are reproduced in the expanded color space-compatible image reproducing apparatus 200 as described above, they are displayed at high speed irrespective of the specified color space for the image data, and when main images are reproduced, the main images are displayed as faithfully as possible taking into account the specified color space for the image data. In other words, both high-speed reproduction of thumbnail images and high-quality reproduction of main images can be realized.

C. Image Reproduction by Expanded Color Space-Incompatible Image Reproducing Apparatus The sequence of operations and image display results pertaining to thumbnail image reproduction in the expanded color space-incompatible image reproducing apparatus 200a (see FIG. 4) are the same as those pertaining to thumbnail image reproduction in the expanded color space-compatible image reproducing apparatus 200 described above with reference to FIGS. 5 and 6. In other words, thumbnail images are displayed at high speed in the expanded color space-incompatible image reproducing apparatus 200a as well.

Figure 9:
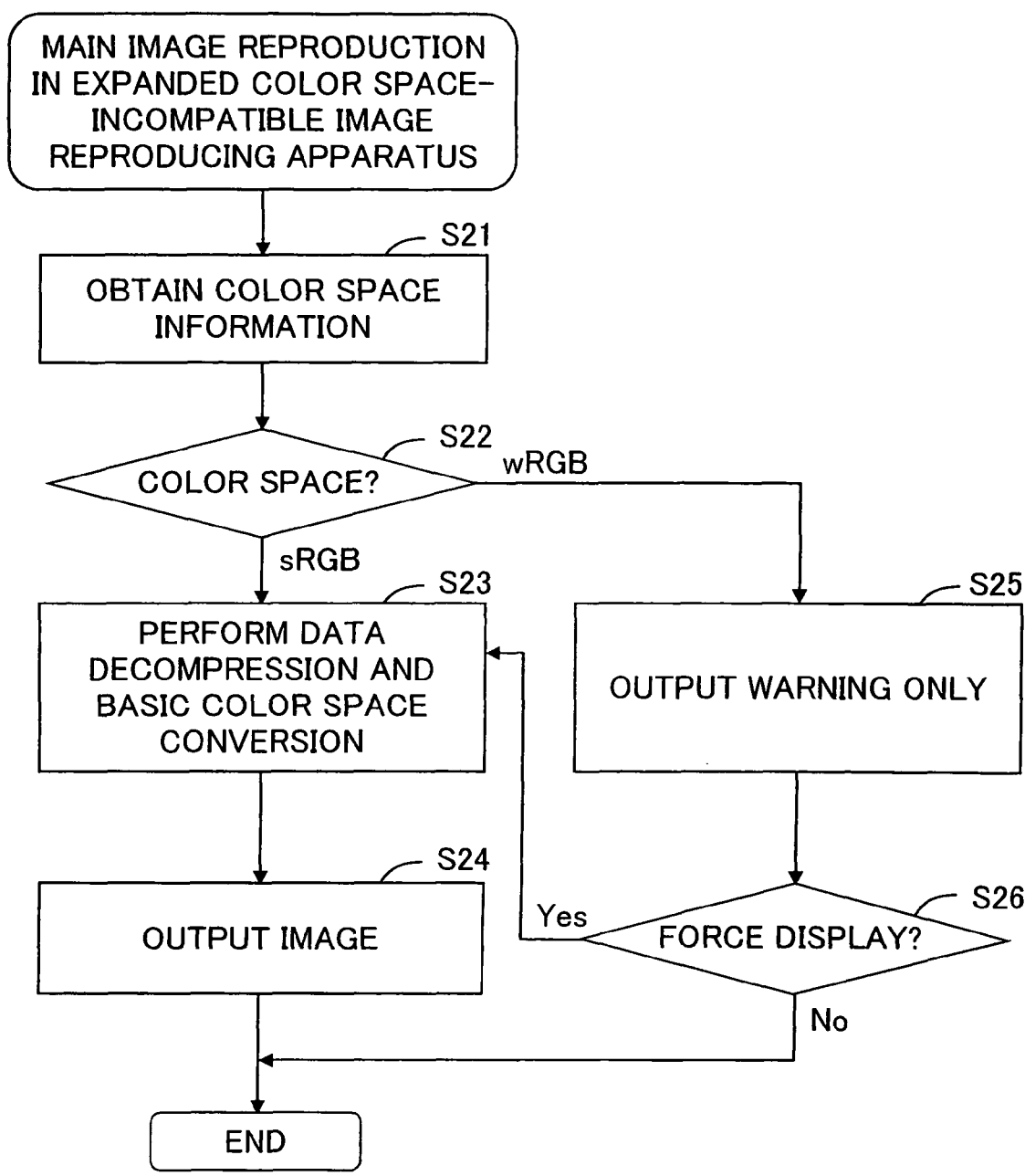
FIG. 9 is a flow chart showing the sequence of operations of a main image reproduction routine executed by the expanded color space-incompatible image reproducing apparatus.
Figure 10A:
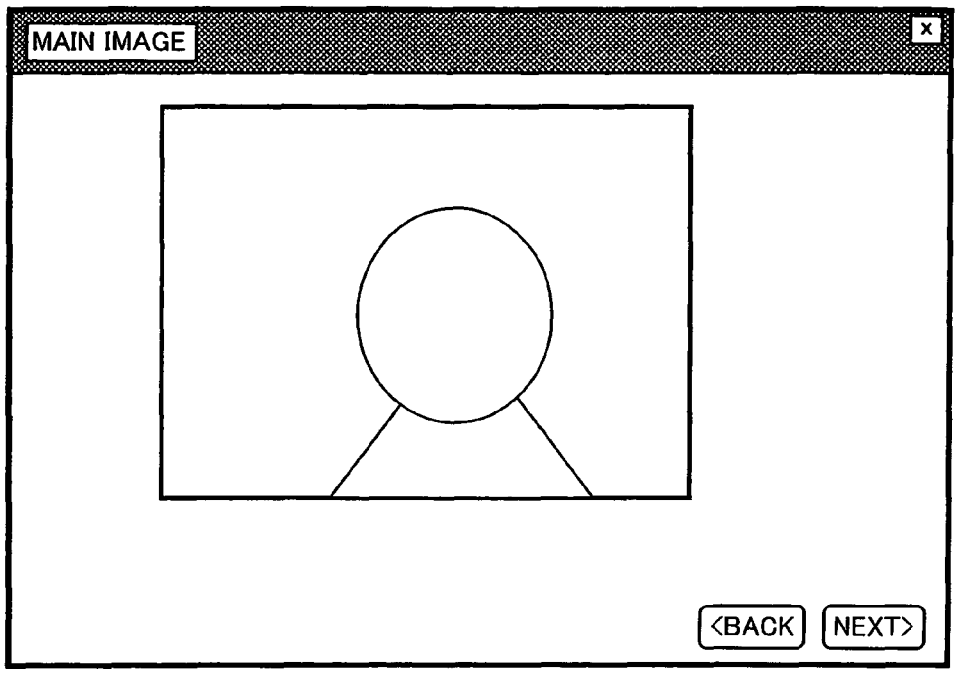
FIGS. 10A and 10B are explanatory drawings of an example of the display during main image reproduction on the expanded color space-compatible image reproducing apparatus.

FIG. 9 is a flow chart showing the sequence of operations of a main image reproduction routine by the expanded color space-incompatible image reproducing apparatus 200a. The obtaining of color space information (step S21) and the determination of the specified color space (step S22) are identical to the corresponding steps S11 and S12 shown in FIG. 7. In addition, the operations of steps S23 and S24 where the specified color space is the standard color space sRGB are identical to the operations of steps S13 and S14 shown in FIG. 7. FIG. 10A is an example of the display of a main image in this case, and is identical to FIG. 8A.

Figure 10B:
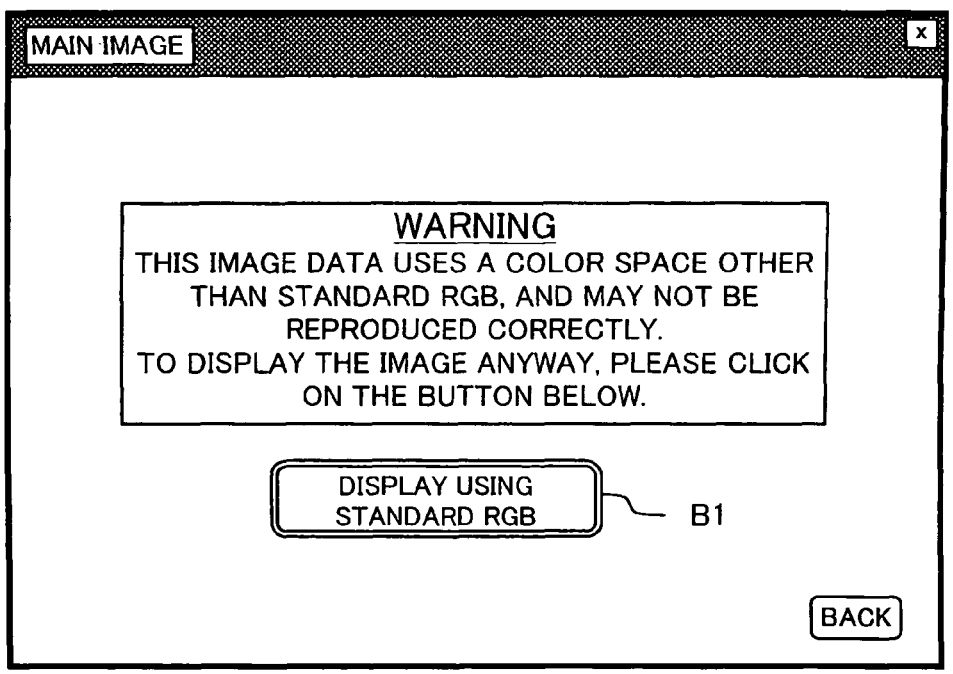

In step S22, where the specified color space is the expanded color space wRGB, only a warning (or notification) is displayed on the monitor 250 in step S25. FIG. 10B shows an example of this warning. Here, a text message is displayed indicating that the image data cannot be correctly reproduced because the specified color space for the processing target image data is not the standard color space sRGB. In addition, a button B1 disposed below this warning enables the user, in step S26, to cause the standard color space sRGB to be deemed the specified color space for the image data and to cause the image to be forcibly displayed using this color space. When the user clicks on this button B1 in step S26, the steps S23 and S24 are executed and the main image is displayed. However, in this case, because device-dependent color space conversion cannot be carried out using the expanded color space wRGB, the displayed colors may deviate substantially from the correct colors.

Where a main image is reproduced in the expanded color space-incompatible image reproducing apparatus 200a as described above, because a warning or notification is displayed when the specified color space for the processing target image data is not the standard color space sRGB, the user can be prevented from mistakenly carrying out processing believing that the processing target image data is based on the standard color space sRGB.

It is acceptable if the warning shown in FIG. 10B is not displayed, the specified color space is deemed the standard color space sRGB, and the main image is directly reproduced via the processing of steps S23 and S24. However, in this case as well, it is preferred that a notification be displayed together with the main image indicating that the specified color space is not the standard color space.

D. Example of Application to Printer

Figure 11:
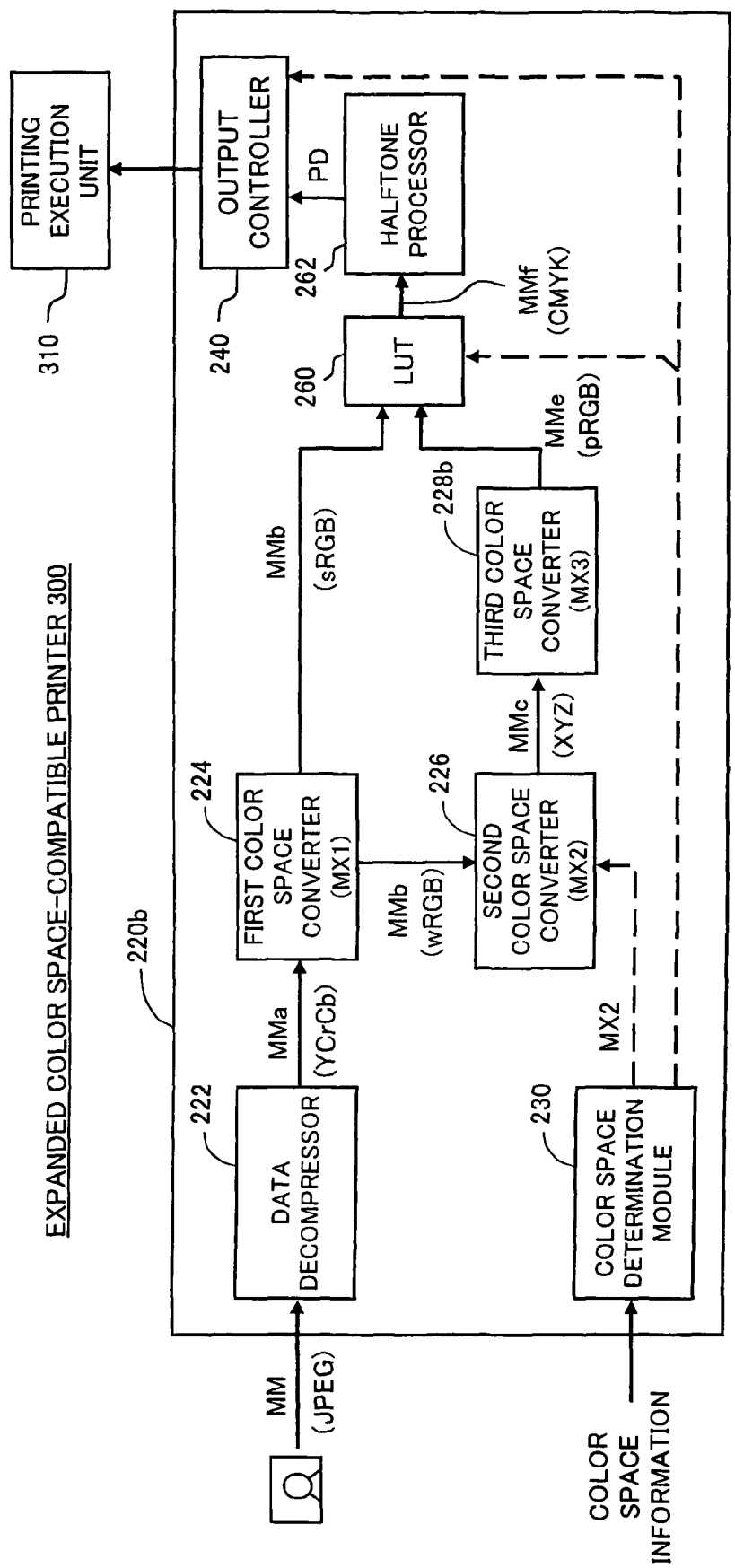
FIG. 11 is a block diagram showing the construction of a printer that is compatible with an expanded color space.

FIG. 11 is a block diagram showing the construction of a printer 300 that is compatible with an expanded color space. The data processor 220b of this printer 300 has, in addition to constituent elements of the data processor 220 shown in FIG. 3, a lookup table 260 and a halftone processor 262. The nature of the processing performed by the third color space converter 228b is rather different from that performed by the third color space converter 228 shown in FIG. 3, while all other aspects of the third color space converter 228b are identical to those of the third color space converter 228 shown in FIG. 3. The functions of the data processor 220b are realized through a so-called 'printer driver'.

The third color space converter 228b has a function to convert the XYZ color space to an RGB color space compatible with the color reproduction range of the printer 300 (termed the 'pRGB color space' below). A color space identical to the expanded color space wRGB may be used as the printer color space pRGB. This color space conversion is determined in advance in accordance with the ink set of the printer 300, and the conversion matrix MX3b for this conversion is stored in advance in the third color space converter 228b.

The lookup table 260 is used to convert the RGB color space to the CMYK color space, and is a type of color space converter. Where the specified color space for the processing target image data is the standard color space sRGB, the image data MMb generated by the first color space converter 224 is input to the lookup table 260 and converted to image data MMf expressed in the CMYK color space. Where the specified color space for the processing target image data is the expanded color space wRGB, on the other hand, the image data MMe generated by the third color space converter 228b is input to the lookup table 260 and converted to CMYK color space image data MMf. It is preferred that a table for sRGB data and a table for PRGB data be separately prepared in advance as lookup tables 260.

In this data processor 228b, the combination of color space conversion by the first color space converter 224 and color space conversion using the lookup table 260 is equivalent to basic color space conversion (i.e., color space conversion not using the expanded color space wRGB). Furthermore, the combination of color space conversion by the first through third color space converters 224, 226, 228 and color space conversion using the lookup table 260 are equivalent to device-dependent color space conversion (i.e., color space conversion using the expanded color space wRGB).

The halftone processor 262 generates print data PD by carrying out halftone processing of the image data MMf generated by the lookup table 260. This print data PD is provided from the output controller 240 to a printing execution unit 310, which carries out printing. The printing execution unit 310 has various constituent elements such as a main scanning drive mechanism, sub-scanning drive mechanism, print head, print head and drive circuit, but further description thereof is omitted here.

When thumbnail images are to be printed, this printer 300 can carry out printing based on the sequence of operations shown in FIG. 5, while when a main image is to be printed, the printer 300 can execute printing based on the sequence of operations shown in FIG. 7. Therefore, thumbnail images can be printed at high speed, while main images can be printed with high image quality. When printing is performed by the printer 300, rather than being printed onto the printing medium together with the warning as in step S16 in FIG. 7, it is acceptable if the image is printed onto the printing medium without the warning, which is displayed only onscreen. The warning screen display may be carried out on the screen of the operation member of the printer 300, for example, or may be carried out on the monitor of a computer on which the printer driver (the data processor 220b of FIG. 11) is installed.

Figure 12:
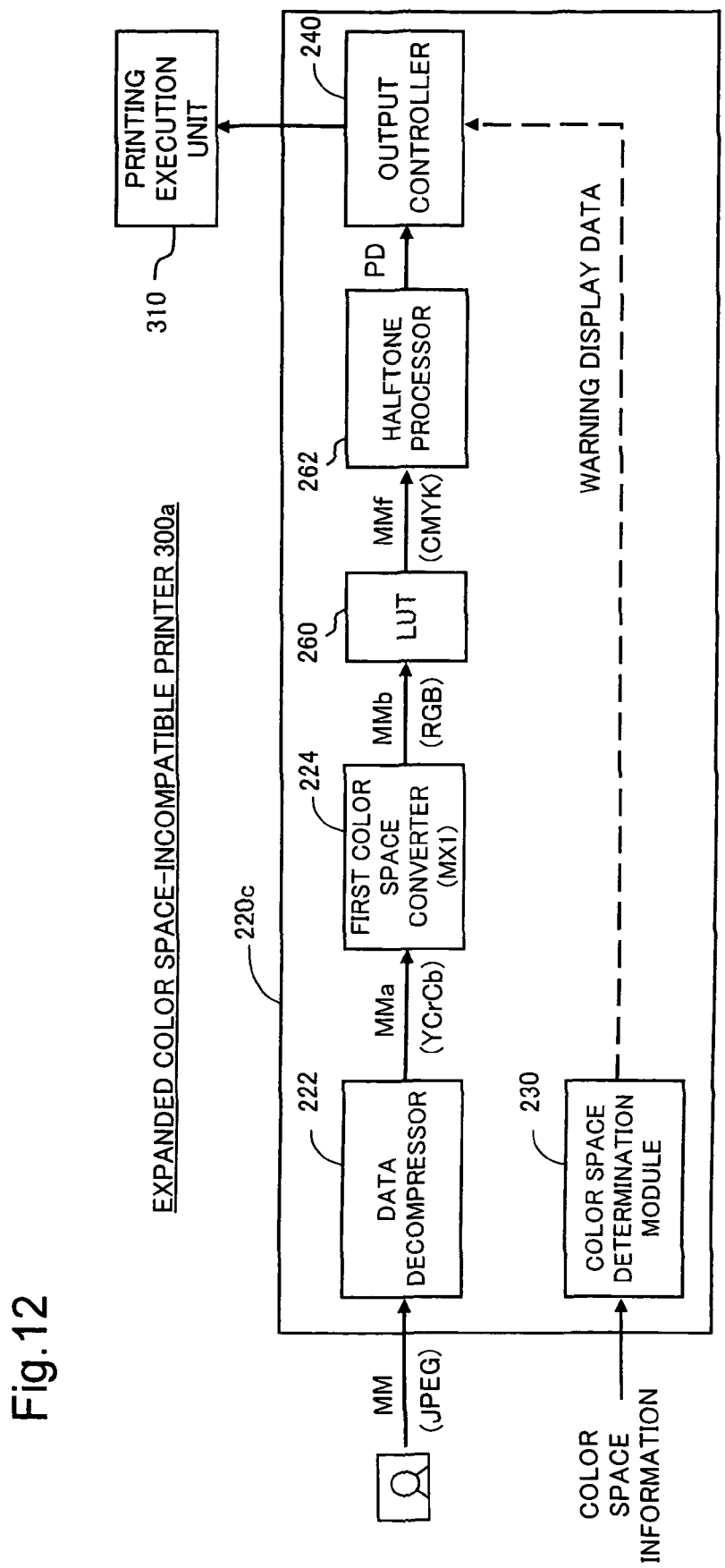
FIG. 12 is a block diagram showing the construction of a printer that is not compatible with an expanded color space.

FIG. 12 is a block diagram showing the construction of an expanded color space-incompatible printer 300a. This printer differs from the printer 300 shown in FIG. 11 only in that it has no second and third color space converters 226, 228b, and is otherwise identical thereto. This expanded color space-incompatible printer 300a, like the image reproducing apparatus 200a shown in FIG. 4, prints images in accordance with the image data MMb generated by the first color space converter 224 irrespective of whether the image data MMb is standard color space sRGB data or expanded color space wRGB data. Therefore, it can faithfully reproduce the image colors if the specified color space is the standard color space sRGB, but cannot faithfully reproduce the image colors if the specified color space is the expanded color space wRGB.

When thumbnail images are to be printed, this expanded color space-incompatible printer 300a can carry out printing based on the sequence of operations shown in FIG. 5, while when a main image is to be printed, the expanded color space-incompatible printer 300a can execute printing based on the sequence of operations shown in FIG. 9. In this case, it is preferred that the warning be displayed onscreen in step S25 in FIG. 9 rather than printed.

Figure 13:
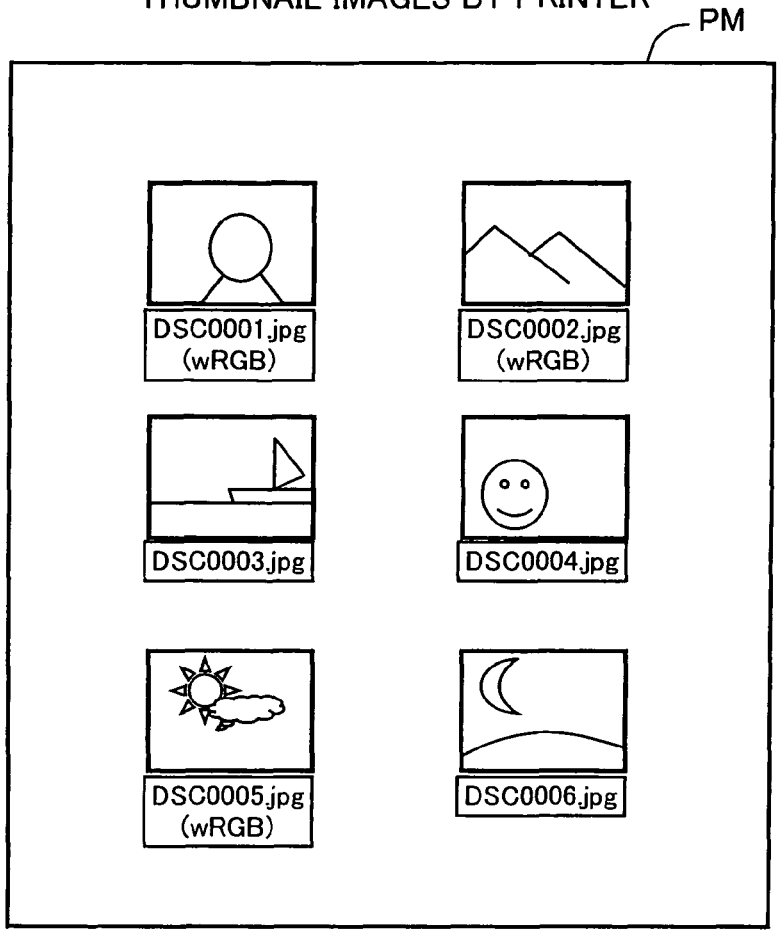
FIG. 13 is an explanatory drawing showing an example in which multiple thumbnail images are printed by a printer onto a printing medium PM.

When printing of images is carried out via the printers in FIG. 11 or 12, it may be convenient for the specified color space for the image data to be displayed at a position adjacent to the printed image. FIG. 13 shows an example in which multiple thumbnail images are printed onto the printing medium MP by a printer. Here, the file name of the thumbnail image file and the description of the specified color space are printed at a position adjacent to (specifically, directly below) each thumbnail image.

However, the description of the specified color space is omitted if the specified color space is the standard color space sRGB, and is displayed only if the specified color space is the expanded color space wRGB. Alternatively, it is acceptable if the description of the specified color space is displayed at a position adjacent to each image at all times. Where image data files are used, such a practice offers the benefit of enabling images to be selected and processed with reference to their color space.

The display of the specified color space as shown in FIG. 13 is not limited to thumbnail images, and may be carried out where main images are printed as well. It is also acceptable if the specified color space is simultaneously displayed when a main image or thumbnail images are displayed in the image reproducing apparatuses shown in FIG. 3 and FIG. 4.

E. Other Embodiment

Figure 15:
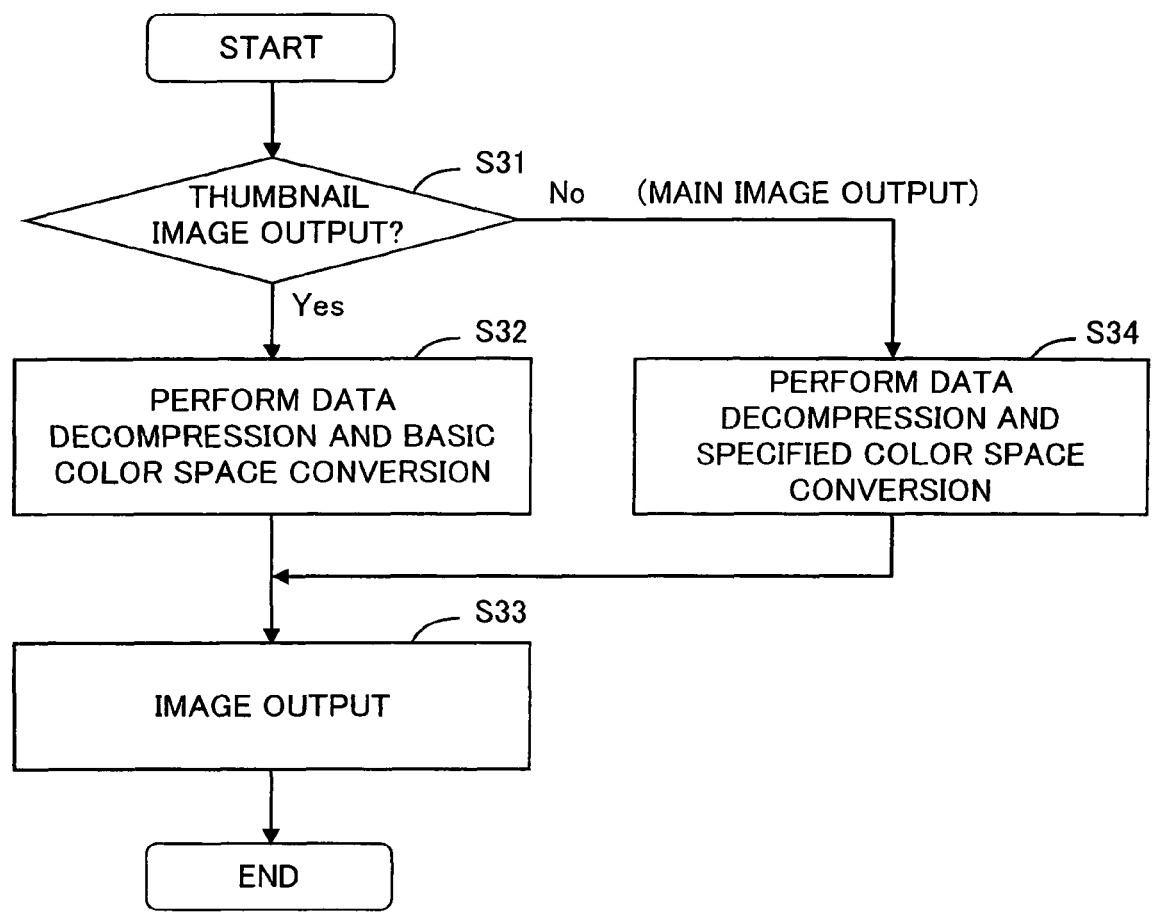
FIG. 15 is a flow chart showing the sequence of operations of an image output routine in another embodiment.

FIG. 15 is a flow chart showing the sequence of operations of an image output routine in another embodiment. This embodiment utilizes an image output apparatus that is compatible with an expanded color space (FIG. 3 and FIG. 11). In step S31, it is judged which of a thumbnail image and a main image is to be output. When a thumbnail image is to be output, the data decompressor 222 (FIG. 3) decompresses the thumbnail image, and the first color space converter 224 performs the basic color space conversion to produce an output image data MMb in step S32. Since the thumbnail image data is usually prepared with a standard color space (for example, sRGB), the image data MMb after the basic color space conversion is defined in the standard color space. This output image data MMb is output, or more specifically, displayed or printed, in step S33. On the other hand, when a main image is to be output, the data decompressor 222 decompresses the main image, and the three color space converters 224, 226, 228 carry out a specified color space conversion to produce an output image data MMd in step S34, and then the image data MMd is output in step S33.

The "specified color space conversion" in step S34 denotes a color space conversion using a specified color space which is specified by the color space information CSI within the image data file (FIG. 2). The specified color space may be selected from the standard color space and various other particular or special color spaces (expanded color spaces). In this embodiment, when the specified color space is the standard color space, the specified color space conversion includes only the basic color space conversion. When the specified color space is a particular or special color space, on the other hand, the specified color space conversion includes both the basic color space conversion and the device dependent color space conversion. It should be noted that the specified color space conversion may utilize other types of color space conversions instead. The specified color space conversion in general is a color space conversion utilizing the specified color space specified by the color space information CSI in one way or another.

It is preferable that the specified color space is specified to be a particular color space (or expanded color space), but not to be the standard color space). In this case, a high quality image can be output as the main image.

As described above, this embodiment carries out the basic color space conversion in reproducing the thumbnail image regardless of the content of the color space information, and carries out the color space conversion utilizing the specified color space in reproducing the main image, thereby attaining both high speed output of thumbnail images and high quality output of main images.

F. Variations

The present invention is not limited to the embodiments and examples described above, and may be realized in various forms within the essential scope thereof. The following variations are possible, for example.

F1. Variation 1

The color space information may take various forms other than the form described in connection with the above embodiments. Moreover, rather than storing the color space information in the image data file, part of the file name of the image data file may be used as the color space information. For example, the specified color space may be expressed by an extension to the file name of the image file. In this case, it is preferred that the color space conversion profile used when the specified color space is a particular color space different from the standard color space be stored in advance in the image reproducing apparatus. This construction offers the advantage of eliminating the need for a color space conversion profile to be stored in each individual image data file MF.

It is furthermore acceptable if the color space information is created separately from the image data and the two are mutually associated with each other. In this case, a construction involving an image data set in which the main image data, the thumbnail image data (reduced image data) and the color space information are mutually associated is preferred. The image data file described in connection with the above embodiments is also a type of image data set in which the main image data, thumbnail image data and color space information are mutually associated with each other. An image data set need not include both main image data and thumbnail image data, and may include only one of these (i.e., the main image data only).

E2. Variation 2

In the above embodiments, where the processing target image data was main image data, the specified color space was determined based on the color space information, while determination of the specified color space was not performed where the processing target image data was thumbnail image data, but specified color space determination may be carried out only where it is deemed necessary by the data processor. However, it is preferred that specified color space determination be carried out at least where main images are to be reproduced.

F3. Variation 3

In the above embodiments, thumbnail image data was created by the digital camera 100 comprising an image generating device, but it is acceptable if main image data and color space identification information, but not thumbnail image data, are created in the image generating device, and the thumbnail image data is created from the main image data by a different application program such as viewing software. In this case as well, because the main image data, thumbnail image data and color space identification information are mutually associated with each other, processing identical to that described in connection with the above embodiments may be carried out during image reproduction.

F4. Variation 4

The display-equipped digital camera 100 can also be used as the image reproducing apparatus in the above embodiments. For example, where an image display unit (corresponding to the image output apparatus in the above embodiments) is disposed on the back of the digital camera 100, when an image is displayed on this image display unit, the digital camera 100 may function as the expanded color space-compatible image generating device or as the expanded color space-incompatible image generating device described in connection with the above embodiments.

Figure 14:
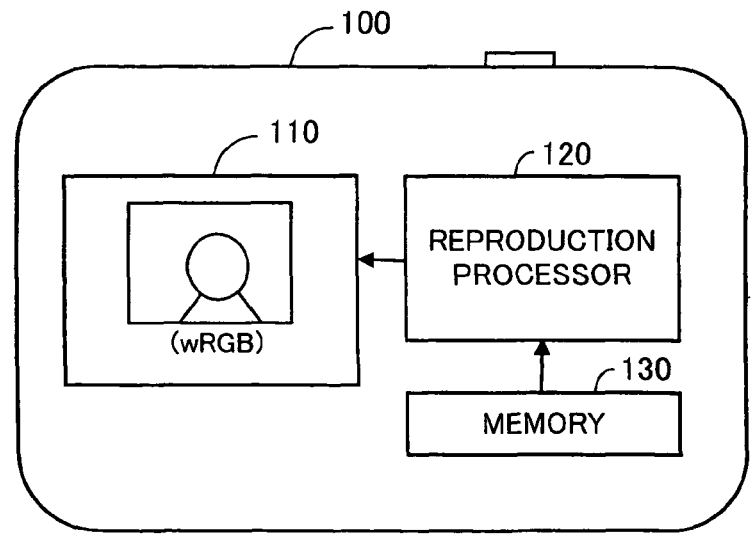
FIG. 14 is an explanatory drawing showing an example in which an image and its associated color space are displayed on an image display unit disposed on the back surface of a digital camera 100.

Moreover, when an image (a main image or thumbnail image) is displayed, a notification that identifies the color space specified by the color space information may be displayed together with the image. FIG. 14 shows an example in which the image and associated color space are displayed on the image display unit disposed on the back of the digital camera 100. The image data captured by the digital camera 100 and its associated color space information are stored in a memory 130. A reproduction processor 120 performs processing to display on the image display unit 110 the image and color space in accordance with the image data and color space information. The specified color space may be displayed on the image display unit not only during image display but also at the time of image capture. If some sort of display identifying the specified color space is displayed on the image display unit together with the image, because the user can acknowledge the color space of the image prior to output of the image to a different image output apparatus (such as a printer or display device), an appropriate output method or output apparatus can be selected.

In this Specification, 'digital camera' includes both a digital still camera that captures still images and a digital video camera that captures moving images.

F5. Variation 5

In the above embodiments, the main image data MM and the thumbnail image data TM within the image data file are both stored in a compressed format, but these image data may be stored in a non-compressed format in the image data file.

INDUSTRIAL APPLICABILITY

The present invention may be applied in an image processing apparatus, an image reproducing apparatus, a digital camera or the like.

The invention claimed is:

1. An image processing apparatus for processing an image based on an image data set including main image data that represents a main image, thumbnail image data that represents a thumbnail image of the main image, and color space identification information that expresses a color space related to the main image data, the main image data and the thumbnail image data and the color space identification information being associated with one another, wherein the color space identification information can indicate which of multiple color spaces including a prescribed standard color space and a particular color space is to be used, the image processing apparatus comprising:

a data processor configured to select either one of the main image data and the thumbnail image data as processing target image data, and to execute processing including color space conversion of the processing target image data, wherein the data processor:

if the thumbnail image is the processing target image data, executes a prescribed basic color space conversion regardless of content of the color space identification information to obtain first converted image data of the thumbnail image, and if the main image is the processing target image data, executes a specified color space conversion utilizing a color space specified by the color space identification information to obtain second converted image data of the main image, the first and second converted image data being expressed by an identical color system.

2. An image processing apparatus according to claim 1, wherein the color space specified by the color space identification information is the particular color space.

3. The image processing apparatus according to claim 2, wherein the processing target image data is to be displayed, and wherein the particular color space is larger than sRGB color space.

4. The image processing apparatus according to claim 2, wherein the processing target image data is to be printed, and wherein the particular color space is larger than sRGB color space.

5. A method for processing an image, comprising:

providing an image data set including main image data that represents a main image, thumbnail image data that represents a thumbnail image of the main image, and color space identification information that expresses a color space related to the main image data, wherein the color space identification information can indicate which of multiple color spaces including a prescribed standard color space and a particular color space is to be used, and the main image data and the thumbnail image data and the color space identification information being associated with one another;

selecting one of the main image data and the thumbnail image data as a processing target image data;

if the thumbnail image is the processing target image data, executing, by an image processing apparatus, a prescribed basic color space conversion regardless of content of the color space identification information to obtain first converted image data of the thumbnail image; and if the main image is the processing target image data, executing a specified color space conversion utilizing a color space specified by the color space identification information to obtain second converted image data of the main image, the first and second converted image data being expressed by an identical color system.

6. An image processing method according to claim 5, wherein the color space specified by the color space identification information is the particular color space.

7. The image processing method according to claim 6, wherein the processing target image data is to be displayed, and wherein the particular color space is larger than sRGB color space.

8. The image processing method according to claim 6, wherein the processing target image data is to be printed, and wherein the particular color space is larger than sRGB color space.

9. A computer program product for reproducing an image based on an image data set including main image data that represents a main image, thumbnail image data that represents a thumbnail image of the main image, and color space identification information that expresses a color space related to the main image data, the main image data and the thumbnail image data and the color space identification information being associated with one another, the computer program product comprising:

a non-transitory computer-readable medium; and a computer program stored on the computer-readable medium, wherein the color space identification information can indicate which of multiple color spaces including a prescribed standard color space and a particular color space is to be used, the computer program comprising:

a function to execute a selection of one of the main image data and the thumbnail image data as a processing target image data;

a function to execute, if the thumbnail image is the processing target image data, a prescribed basic color space conversion regardless of content of the color space identification information to obtain first converted image data of the thumbnail image; and a function to execute, if the main image is the processing target image data, a specified color space conversion utilizing a color space specified by the color space identification information to obtain second converted image data of the main image, the first and second converted image data being expressed by an identical color system.

10. A computer program product according to claim 9, wherein the color space specified by the color space identification information is the particular color space.

* * * * *